ically off set from the front wheel steering column, which has a smaller crank arm mounted thereon, the two crank arms being connected by a pivotably mounted crank shaft such that a turn of the handlebars is amplified to a greater turn of the steering column and wheel.

United States Patent [19]
Silva, Jr.

[11] 4,108,460
[45] Aug. 22, 1978

[54] AMPLIFIED CYCLE STEERING SYSTEM

[76] Inventor: John C. Silva, Jr., P.O. Box 1082, Saugus, Mass. 01906

[21] Appl. No.: 574,409

[22] Filed: May 5, 1975

[51] Int. Cl.² .................... B62K 21/10; B62K 21/18
[52] U.S. Cl. .................... 280/236; 280/263; 280/271; 280/281 LP
[58] Field of Search .......... 280/263, 271, 260, 261, 280/236, 281 R, 281 LP; 74/492, 494, 495, 496, 497, 498

[56] References Cited
U.S. PATENT DOCUMENTS

| 3,901,095 | 8/1975 | Wechsler | 280/261 |
| 3,921,467 | 11/1975 | Matsuura | 280/261 |

FOREIGN PATENT DOCUMENTS

| 846,679 | 9/1939 | France | 280/263 |
| 857,529 | 9/1940 | France | 280/263 |
| 729,782 | 5/1955 | United Kingdom | 280/263 |
| 871 of | 1890 | United Kingdom | 280/271 |
| 10,652 of | 1885 | United Kingdom | 280/263 |

Primary Examiner—Kenneth H. Betts
Attorney, Agent, or Firm—Thomas C. Stover, Jr.

[57] ABSTRACT

An amplified steering system for a bicycle having a canted steering wheel is provided wherein the handlebar steering column which has a crank arm mounted thereon, is axially off set from the front wheel steering column, which has a smaller crank arm mounted thereon, the two crank arms being connected by a pivotably mounted crank shaft such that a turn of the handlebars is amplified to a greater turn of the steering column and wheel.

12 Claims, 4 Drawing Figures

U.S. Patent     Aug. 22, 1978     4,108,460
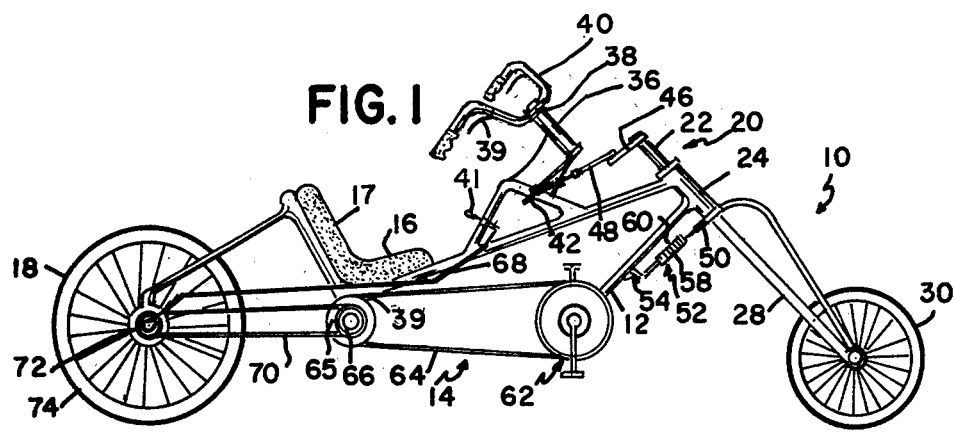
FIG. 1
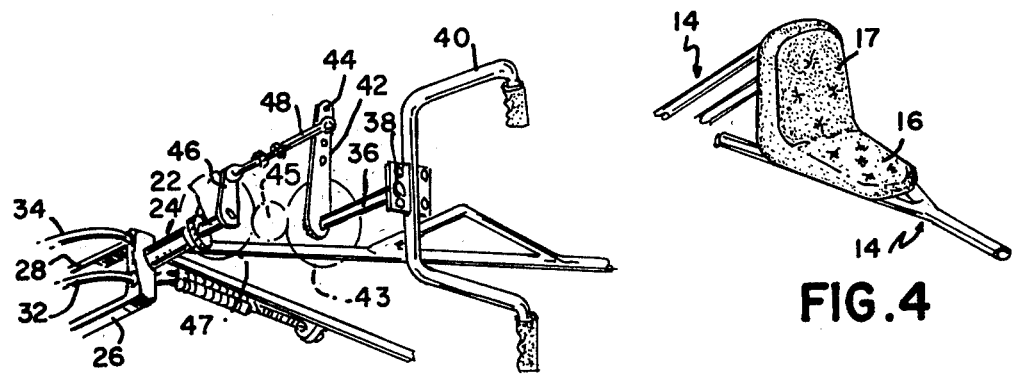
FIG. 2
FIG. 4
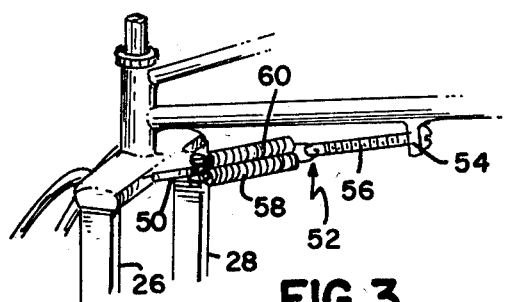
FIG. 3

AMPLIFIED CYCLE STEERING SYSTEM

FIELD OF THE INVENTION

This invention relates to a steering system for multi-wheeled cycles particularly an amplified steering system for such cycles.

THE PRIOR ART

In typical multi-wheeled cycles including the highly evolved and widely used (safety) bicycle, the handle bars connect directly to the steering column and the steering wheel mounted thereon. The wheel turns directly and to the extent the handle bars are rotated or turned.

This common steering system works well as long as the steering column is mounted vertically or nearly so, i.e. between 60° to 90° with the horizontal longitudinal axis of the bicycle. However, as the steering column is canted below 90° eg. 60° to 30° with such axis, then much greater turning of handle bars and front wheel is required to enable the bicycle to execute a turn which can unbalance the rider such that turning a corner becomes hazardous. Accordingly, there is a need and market for a steering system which overcomes the above steering system difficulties for cycles with significantly canted steering columns.

There has now been developed a cycle steering system wherein the turning of the handle bars or other manual steering means is amplified to more greatly turn the cycle steering column and steering wheel thereof so that such cycle can be turned without severe or excessive turning of such handle bars. The cycle steering system of the invention is further provided with an anti-jackknifing resilent means to resist unintended turning of the cycle steering wheel.

SUMMARY

Broadly, the present invention provides an amplified steering system for multi-wheeled cycles comprising a steering column rotatably mounted on said cycle, a wheel mounted on the lower portion of said steering column, a first gear-lever means on the upper portion of said steering column sized to describe a relatively small arc per degree turn of said column and wheel, manual steering means rotationally mounted on said cycle, a second gear-lever means mounted on said manual steering means to engage said first gear-lever means, said second gear-lever means being sized to describe a relatively large arc per degree turn of said manual steering means such that a turn of said manual steering means is amplified to a greater turn of said steering column and wheel.

The invention further provides a cycle steering system for multi-wheeled cycles wherein an anti-jackknifing resilent means tautly connects said steering column to the cycle frame therebehind to resist unintended turning of said steering column and the wheel mounted thereon.

DESCRIPTION

These and other features of the present invention will become more apparent from the following detailed specification and drawings in which:

FIG. 1 is an elevation view of a bicycle embodying the present invention.

FIG. 2 is an enlarged isometric fragmentary detail of a portion of the bicycle of FIG. 1;

FIG. 3 is an enlarged isometric fragmentary detail of another portion of the bicycle of FIG. 1 and FIG. 4 is an enlarged isometric fragmentary detail of another portion of the bicycle of FIG. 1.

Referring now to the drawings, bicycle 10 has frame 12 on which is mounted chain drive system 14, seat 16, rear wheel 18 and steering system 20, as shown in FIG. 1. The steering system 20 has steering column 22 rotatably mounted in frame collar 24. The steering column 22 divides into fork arms 26 and 28, which frame and support front wheel 30 along with reinforcement arms 32 and 34, as shown in FIGS. 1 and 2. By "steering column", as used herein, is meant the column and fork at the lower portion thereof.

Also, rotatably mounted in upper frame collar 36 is manual steering column 38, which supports yoke shaped handle bars 40 as shown in FIGS. 1 and 2. At the base of the manual steering column 38 is mounted crank arm 42, having a plurality of apertures 44 therein, as shown in FIGS. 1 and 2. Mounted at the top of steering column 22 is relatively small crank arm 46, which crank arm is connected to the longer crank arm 42 by crank shaft 48 as shown in FIGS. 1 and 2.

In operation, the turning of handle bars 40 and manual steering column 38 is transmitted along crank arm 42 and crank shaft 48 to steering column crank arm 46, such that each degree of rotation of the handle bars 40 is amplified through the crank arm system to apply a greater degree of rotation or turning to the crank arm 46 and the steering column 22 and the front steering wheel 30 to render the severely canted steering column 22 and steering wheel 30, readily steerable, particularly in cornering, as shown in FIGS. 1 and 2.

The tendency of the canted front wheel 30 to jacknife is considerably reduced by the mounting on the rear side of the steering column fork support, anti-jacknifing assembly 52, which includes bicycle frame tab 54, helical screw 56 in threaded engagement therewith, a pair of helical springs 58 and 60 connected at one end to the screw arm 56 and at the other end thereof connected to rearwardly projecting fork arm 50, as shown in FIGS. 1 and 3. The tension on the springs 58 and 60 is adjusted by turning the threaded screw 56 through the tab 54 to obtain a desired spring tension on the steering column 22 including fork arms 28 and 26 and wheel 30, so that any tendency of the wheel to rotate or jackknife will cause the tab 50 to swing against the taut resilent restraint of springs 58 and 50, which accordingly resists unintended turning or jackknifing of said steering column and wheel. The above spring tension is set according to the weight of the operator, tighter for heavier operators, i.e. sufficiently tight to avoid steering wheel wobble in operation yet not overtight so as to impede or burden such steering.

Although the above-described amplified steering system applies to various multi-wheeled cycles including bicycles in conventional use, such system also applies to the novel model illustrated in FIG. 1, which employs a tri-sprocket, double chain drive assembly. Thus crank pedal sprocket assembly 62 drives chain 64 which drives multi-speed middle spaced sprocket 65, which drives larger middle gear 66, which in turn, drives chain 70, which drives multi-speed rear wheel sprocket 72 and thus the rear wheel 74 as shown in FIG. 1. The rear wheel multi-speed sprocket 72 is shifted by means of pull chain 68 and lever 74 and the middle spaced multi-speed sprocket 65 and 66 is shifted by lever 39 mounted on the handle bars 40, as shown in FIG. 1. Thus high speeds can be achieved in the above described bicycle by pulling the lever 74 to shift the transmission of the bicycle into high (or lower) gear. The embodiment of the present invention further provides low center of gravity mounted cushion seat 16 with back rest 17 for low wind resistance and stability, as shown in FIG. 1.

From the above description it can be seen that the present invention provides a novel amplified steering system for multi-wheeled cycles including bicycles, tricycles, cycles having more than three wheels, motor cycles having two or more wheels and the like. The amplified steering system of the invention is particularly suited to multi-wheeled cycles having a canted steering column and wheel, where steering becomes progressively difficult as the cant increases, i.e. as the angle of the cant with the horizontal, longitudinal axis of the cycle decreases. The amplified steering system of the present invention is suitable for conventional bicycles or other multi-wheeled cycles wherein the steering column and the wheel is mounted at a cant angle of between 90° and 20° with the horizontal longitudinal axis of the cycle and is particularly suitable at angles between 30° and 50° therewith. Since greater turning angles of the handle bars is required, the greater the cant of the steering column and wheel, the amplified steering system of the present invention magnifies the affect of turning the handle bars on the steering wheel and makes steering of highly canted steering wheels feasible.

The crank system which connects the manual steering means of the invention to the steering column of the cycle includes "gear-lever means" which, as used herein define both gears and crank arms. Thus, as shown in FIGS. 1 and 2, crank arms 42 and 46, connected by crank shaft 48 are employed as gear-lever means to amplify the manual steering applied to the steering wheel. Crank arm 42 has a plurality of apertures 44 to provide a choice of positions of crank arm 48 to render the amplification of steering adjustable, as shown in FIG. 2. However, the gear-lever system embodying the invention can be replaced by gears. Thus crank arm 42 on manual steering means 38 can be replaced with relatively by large gear 43, shown in phantom, which engages an idler gear (no numeral) which in turn engages a smaller gear 47, shown in phantom, mounted on steering column 22, which replaces small crank arm 46 as shown in FIG. 2. Spaced gears 43 and 47 can also be connected by an endless belt or chain (not shown). The crank arm system of the invention being adjustable is, however, preferred.

The stabilizer or anti-jackknife means of the present invention can employ one or more springs connected to a rearwardly extending arm, as shown in FIGS. 1 and 3. However, such springs can also be connected to the respective fork arms of the steering column to stabilize the front wheel where desired. However, the springed stabilizer embodying the invention, shown in FIGS. 1 and 3, is preferred because the spring tension is relatively low while the steering wheel points straight ahead (on the long bicycle axis).

As stated above, the amplified steering system of the present invention applies to multi-wheeled cycles of various kinds including bicycles with the conventional two sprocket and chain system, single or multi speeds, as well as to the tri-spaced sprockets, dual chain system of the radical bicycle shown in FIG. 1, within the scope of the present invention.

Multi-wheeled cycles of the present invention can have conventional bicycle and motor cycle seats and can also have a cushioned relatively wide seat 16 with back rest 17 as illustrated in FIGS. 1 and 4.

What is claimed is:

1. A multi-wheel cycle comprising, a steering column rotatably mounted on said cycle at a cant of between 20° and 60° with the longitudinal axis of the cycle frame, a steering wheel mounted on the lower portion of said steering column, an amplified steering system for said cycle including, a first lever means on the upper portion of said steering column sized to describe a relatively small arc per degree turn of said column and wheel, manual steering means rotationally mounted on said cycle on a second rotatable column positioned aft and extending above said first lever means, a second lever means mounted on said second rotatable column below said manual steering means, means operatively connecting said first and second lever means, said second lever means being sized to describe a relatively large arc per degree turn of said manual steering means such that a turn of said manual steering means is amplified to a greater turn of said steering column and wheel and weight-adjustable, anti-jackknifing resilient means including, a rigid arm mounted on the rotatable steering column and tension spring means, adjustable to the weight of the cycle operator, connecting said arm to a portion of the cycle frame and means for adjusting said spring in proportion to the weight of said operator to balance said steering wheel such that any turning of said wheel will pivot said arm against the so-adjusted resistance of said spring to assist in the balanced steering of said cycle.

2. The multi-wheel cycle of claim 1 wherein said rigid arm attaches to the steering fork of said steering column.

3. The multi-wheel cycle of claim 1 wherein said rigid arm extends aft when said steering wheel points forward and said tension spring means connects said arm to a portion of the cycle frame behind said column.

4. The multi-wheel cycle of claim 1 wherein said cycle is a bicycle.

5. The multi-wheel cycle of claim 1 wherein said cycle has three or more wheels.

6. The multi-wheel cycle of claim 1 wherein said cycle is a motor cycle.

7. The multi-wheel cycle of claim 1 wherein said first lever means is a relatively small crank arm extending outwardly from said steering column, said second lever means is a larger crank arm extending outwardly from said manual steering means and said cranks are connected by a pivotably mounted crank shaft.

8. The multi-wheel cycle of claim 1 wherein said manual steering means is a pair of forked handle bars.

9. The multi-wheel cycle of claim 1 wherein said steering column is mounted at an angle of between 30° to 50° of said axis.

10. The multi-wheel cycle of claim 1 wherein said cycle has a crank pedal sprocket assembly mounted thereon, a middle spaced multi-speed sprocket assembly mounted in alignment therebehind and a rear wheel multi-speed sprocket assembly mounted in alignment further behind, a first endless chain drive tautly connecting said crank pedal sprocket with a sprocket on said middle assembly, a second endless chain drive tautly connecting another sprocket on said middle assembly and transmission means for independently shifting rotational gear speeds respectively in each of said middle and rear sprocket assemblies.

11. The multi-wheel cycle of claim 1 having a seat with a back-rest mounted thereon.

12. The multi-wheel cycle of claim 1 having a seat mounted between at least two wheels thereof and at least partially below the upper portion of at least one of said wheels.

* * * * *